(12) United States Patent
Ali

(10) Patent No.: US 12,448,278 B2
(45) Date of Patent: Oct. 21, 2025

(54) MEMS OPTICAL MICROPHONE

(71) Applicant: AAC ACOUSTIC TECHNOLOGIES (SHENZHEN) CO., LTD., Shenzhen (CN)

(72) Inventor: Taimoor Ali, London (GB)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 539 days.

(21) Appl. No.: 17/952,357

(22) Filed: Sep. 26, 2022

(65) Prior Publication Data

US 2024/0101410 A1   Mar. 28, 2024

(51) Int. Cl.
  H04R 3/00      (2006.01)
  B81B 3/00      (2006.01)
  H04R 23/00     (2006.01)

(52) U.S. Cl.
  CPC ......... *B81B 3/0021* (2013.01); *H04R 23/008* (2013.01); *B81B 2201/0257* (2013.01); *B81B 2201/047* (2013.01); *B81B 2203/0127* (2013.01); *B81B 2203/0315* (2013.01); *B81B 2203/053* (2013.01); *H04R 2201/003* (2013.01)

(58) Field of Classification Search
  CPC .......... B81B 3/0021; B81B 2201/0257; B81B 2201/047; B81B 2203/0127; B81B 2203/0307; B81B 2203/0315; B81B 2203/0353; B81B 2203/053; H04R 23/008; H04R 2201/003

USPC .................................. 257/416; 381/111, 122
See application file for complete search history.

(56) References Cited

U.S. PATENT DOCUMENTS

| | | | |
|---|---|---|---|
| 7,355,720 B1 * | 4/2008 | Carr ..................... | H04R 23/008 356/498 |
| 2015/0365770 A1 * | 12/2015 | Lautenschlager .... | H04R 19/005 381/172 |
| 2019/0084827 A1 * | 3/2019 | Dehe ..................... | H04R 19/04 |

* cited by examiner

*Primary Examiner* — Ammar T Hamid
(74) *Attorney, Agent, or Firm* — Wiersch Law Group

(57) ABSTRACT

An MEMS optical microphone, including a casing including an inner cavity and a sound inlet that communicates the inner cavity with outside; an MEMS module including a diaphragm suspended in the inner cavity, an aperture is provided penetrating through the diaphragm, and a size of the aperture increases or decreases with acoustic pressure applied to the diaphragm; an optoelectronic module including an electromagnetic radiation source and a sensor arranged on opposite sides of the diaphragm, the sensor is configured to receive a light beam emitted by the electromagnetic radiation source, the light beam covers the aperture, and a size of the light beam is larger than a maximum size of the aperture; and an integrated circuit module electrically connected with the MEMS module and the optoelectronic module. Dynamic range of the MEMS optical microphone is improved, wider range of sound signals can be sensed, and higher sensitivity can be realized.

9 Claims, 3 Drawing Sheets

MEMS OPTICAL MICROPHONE

TECHNICAL FIELD

The present disclosure relates to the technical field of microphones and, in particular, to an MEMS optical microphone.

BACKGROUND

Conventional microphones are based on capacitors, where a diaphragm vibrates with sound waves and generates a voltage change upon changing a distance between plates of the capacitors, thereby achieving acoustic-electrical conversion.

Optical microphone is a new type of microphone. An optical microphone generally includes: an optoelectronic module, an application specific integrated circuit (ASIC), and a micro-electro-mechanical system (MEMS). The optoelectronic module can emit light to the MEMS, and receive light reflected by the MEMS. When sound wave actuates the diaphragm of the MEMS, the diaphragm vibrates slightly and thus changes intensity and phase of the light reflected back to the optoelectronic module. The optoelectronic module converts the intensity and phase signal of the reflected light into an electrical signal, and transmits to the ASIC, so as to realize transformation from acoustic signal to optical signal and then to electrical signal.

With the increasingly high experience requirements of consumers, it is necessary to propose an MEMS optical microphone with better performance.

SUMMARY

The purpose of the present disclosure is to provide an MEMS optical microphone to solve the technical problems in the related art.

The present disclosure provides an MEMS optical microphone, including: a casing including an inner cavity and a sound inlet that communicates the inner cavity with outside; an MEMS module including a diaphragm suspended in the inner cavity, an aperture is provided penetrating through the diaphragm, and a size of the aperture increases or decreases with a magnitude of an acoustic pressure applied to the diaphragm; an optoelectronic module including an electromagnetic radiation source and a sensor arranged on opposite sides of the diaphragm, the sensor is configured to receive a light beam emitted by the electromagnetic radiation source, the light beam covers the aperture, and a size of the light beam is larger than a maximum size of the aperture; and an integrated circuit module electrically connected with the optoelectronic module.

As an improvement, the light beam includes a diffuser section, a size of the diffuser section gradually increases along an extending direction of the light beam, and a narrow diameter end of the diffuser section comes from the electromagnetic radiation source.

As an improvement, a light diffuser is arranged between the electromagnetic radiation source and the diaphragm, and the light beam passes through the light diffuser and incident into the aperture, and a size of the light beam between the electromagnetic radiation source and the light diffuser is smaller than a size of the light beam between the light diffuser and the diaphragm.

As an improvement, the light diffuser includes a plano-concave lens and a biconvex lens, and the plano-concave lens and the biconvex lens are arranged in sequence along an extending direction of the light beam, and the plano-concave lens is closer to the electromagnetic radiation source than the biconvex lens.

As an improvement, the diaphragm includes a first membrane and a second membrane that are independent of each other, and the light beam includes a first optical path and a second optical path that are independent of each other, the apertures include a first sub-aperture on the first membrane and a second sub-aperture on the second membrane; the first light path covers the first sub-aperture, the second optical path covers the second sub-aperture, and there exists a difference between a size of the first sub-aperture and a size of the second sub-aperture.

As an improvement, the electromagnetic radiation source includes a laser or a light emitting diode, and the sensor includes a photodiode.

As an improvement, the inner cavity comprises a first shell wall, a second shell wall, and a side shell connecting the first shell wall and the second shell wall, the first shell wall is opposite to the second shell wall; the MEMS module and the integrated circuit module are arranged on the first shell wall, and the sound inlet is provided on the first shell wall or the second shell wall.

As an improvement, a plurality of sound inlets are provided, and the plurality of sound inlets are distributed on the first shell wall or the second shell wall.

As an improvement, the sound inlet is provided on the first shell wall, the MEMS module further includes a support arm, and opposite ends of the support arm are connected to the diaphragm and the first shell wall, so as to suspend the diaphragm in the inner cavity; the diaphragm separates the inner cavity along an incident direction of the sound wave to form a front cavity and a rear cavity, and the front cavity covers the sound inlet.

As an improvement, the diaphragm is formed as a shape symmetrical about a geometric center thereof, and the aperture is provided at the geometric center of the diaphragm.

Compared with the related art, the present disclosure improves the dynamic range of the MEMS optical microphone by setting the size of the beam emitted by the electromagnetic radiation source to be larger than the maximum size of the aperture, the dynamic range of the MEMS optical microphone is improved, thus a wider range of sound signals can be sensed, and a higher sensitivity to linear changes of the radiation or light intensity caused by the sound signals can be realized.

REFERENCE SIGNS

Figure 1:
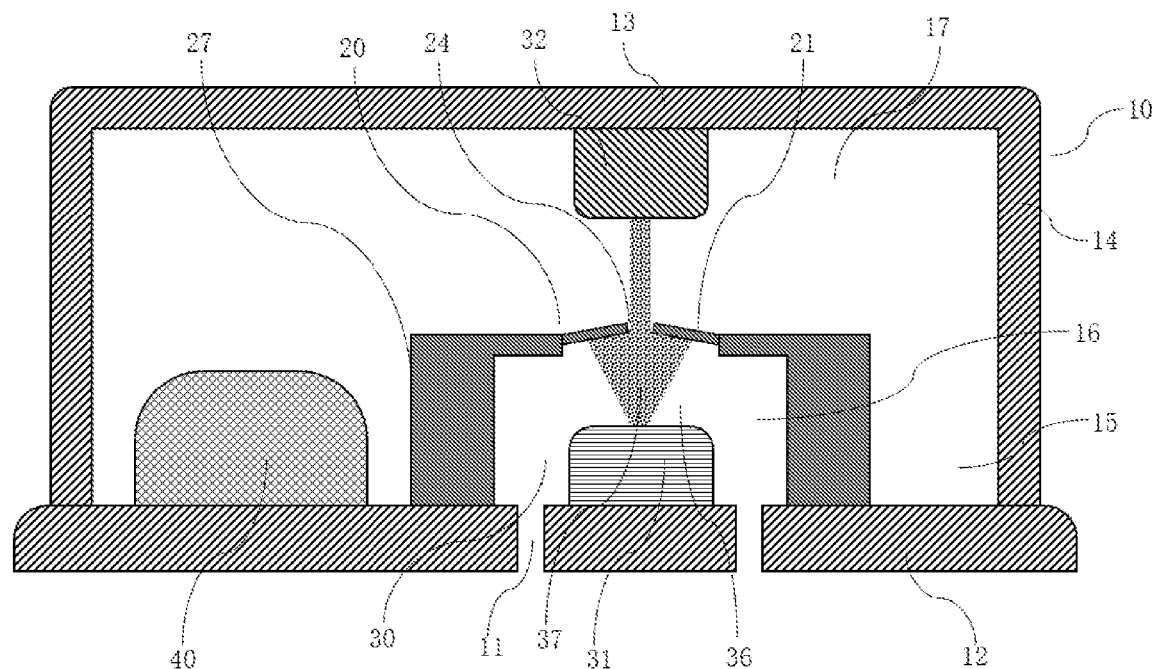
FIG. 1 is a schematic structural diagram of an MEMS optical microphone according to a first embodiment of the present disclosure.

10—shell, 11—sound inlet, 12—first shell wall, 13—second shell wall, 14—side shell wall, 15—inner cavity, 16—front cavity, 17—back cavity;
20—MEMS, 21—diaphragm, 22—first membrane, 23—second membrane, 24—aperture, 25—first sub-aperture, 26—second sub-aperture, 27—support arm;
30—optoelectronic module, 31—electromagnetic radiation source, 32—sensor, 33—light diffuser, 34—plano-concave lens, 35—biconvex lens, 36—beam, 37—diffusion section, 38—first optical path, 39—second optical path;
40—integrated circuit module (ASIC).

DESCRIPTION OF EMBODIMENTS

Embodiments described below with reference to the accompanying drawings are exemplary and are only used to explain the present disclosure, but not to be construed as limitations to the present disclosure.

As shown in FIGS. 1 to 6, an embodiment of the present disclosure provides an MEMS optical microphone, including: a shell 10, an MEMS 20, an optoelectronic module 30 and an integrated circuit module (ASIC) 40.

The shell 10 has an inner cavity 15 and a sound inlet 11 that communicates the inner cavity 15 with the outside. In an embodiment, the inner cavity 15 includes a first shell wall 12, a second shell wall 13, and a side shell wall 14 connecting the first shell wall 12 and the second shell wall 13. The first shell wall 12 and the second shell wall 13 are opposite to each other, and the MEMS 20 and the integrated circuit module (ASIC) 40 are arranged on the first shell wall 12. The sound inlet 11 is provided on the first shell wall 12 or the second shell wall 13. It should be noted that the side shell wall 14 can be integrally formed as a part of the first shell wall 12 or the second shell wall 13, or can be an independent part.

The MEMS 20 includes a diaphragm 21, the diaphragm 21 is suspended in the inner cavity 15, and an aperture 24 is formed through the diaphragm 21. The size of the aperture 24 increases or decreases with the magnitude of an acoustic pressure applied to the diaphragm 21. When the optical microphone is in use, sound waves enter the shell 10 through the sound inlet 11 and actuate the vibration of the diaphragm 21 and the aperture 24. When the diaphragm 21 is actuated, the diaphragm 21 moves upwards (or downwards depending on the type of the microphone) and the diaphragm 21 moves downwards in the opposite direction (or upwards depending on the type of the microphone) just like a standard oscillating structure, with specific frequency and displacement. The frequency depends on the frequency of the sound wave, and the displacement depends on the pressure of the sound wave, the aperture 24 and the diaphragm 21 move to open accordingly.

In a balanced state when no pressure or sound signal is applied, no sound wave enters into the sound inlet 11, the diaphragm 21 remains in a natural state, and the aperture 24 is in a closed state or a slightly open state. When the aperture 24 is closed, the light cannot pass through the aperture 24. When the sound wave enters from the sound inlet 11 and actuates the diaphragm 21 and the aperture 24 of the MEMS 20, and the amount of light passes through the aperture 24 changes accordingly. When the size of the aperture 24 is larger, the amount of light passing through is larger, and when the size of the aperture 24 is smaller, the amount of light passing through is smaller.

The optoelectronic module 30 includes an electromagnetic radiation source 31 including, for example, an infrared (IR), visible light or ultraviolet (UV) source, which may also be a laser or a light emitting diode; a sensor 32 including a photodiode. The electromagnetic radiation source 31 and the sensors 32 are arranged on opposite sides of the diaphragm 21. In one embodiment, the electromagnetic radiation source 31 is arranged on the first shell wall 12, the sensor 32 is arranged on the second shell wall 13, and the electromagnetic radiation source 31 and the sensor 32 are arranged directly facing the aperture 24. The sensor 32 is configured to receive the light beam 36 emitted by the electromagnetic radiation source 31. The light beam 36 covers the aperture 24, and the size of the light beam 36 is larger than the maximum size of the aperture 24.

When the aperture 24 opens to the upper limit position, the size of the aperture 24 is the largest. At this time, the aperture 24 is still within the coverage of the light beam 36. If the size of the light beam 36 is smaller than the maximum size of the aperture 24, it may be the case that when the aperture 24 has not been opened to its maximum size, the amount of light transmitted through the light beam 36 has already reached its maximum value. In this case, when the size of the aperture 24 is further opened due to the change of the sound signal, for example, when the size of the aperture 24 reaches the maximum size, the amount of light passing through the aperture 24 will remain unchanged. Therefore, a constant photocurrent is recorded in the sensor 32 for an acoustic signal of this level. This means that even though the aperture 24 can change its size, the sensor 32 will limit the detection of certain levels of sound signals. This will limit the dynamic range of the sensor 32. By setting the size of the light beam 36 emitted by the electromagnetic radiation source 31 to be larger than the maximum size of the aperture 24, the dynamic range of the MEMS optical microphone is improved, thus a wider range of sound signals can be sensed, and a higher sensitivity to linear changes of the radiation or light intensity caused by the sound signals can be realized.

As the diaphragm 21 vibrates through actuation by the acoustic pressure, the size of the aperture 24 changes accordingly, and the light amount of the light beam 36 passing therethrough also changes synchronously. The light intensity increases as the sound pressure increases and as the aperture size of the aperture 24 increases. The sensor 32 receives this light beam 36, and the change in light intensity generates a photocurrent corresponding to the level of the applied sound signal, and the light signal represented by the photocurrent is sent to the integrated circuit module (ASIC) 40 to realize the conversion from an acoustic signal to an optical signal and then to an electrical signal.

The integrated circuit module (ASIC) 40 is electrically connected to the optoelectronic module 30, and can be connected to the MEMS 20. The integrated circuit module (ASIC) 40 includes an electronic circuit that constitutes a control or central processing unit and is configured to drive, control and implement necessary action to the related electronic and optoelectronic components in the system.

Referring to FIG. 1, FIG. 1 is a schematic structural diagram of an MEMS optical microphone according to a first embodiment of the present disclosure. In the technical solution according to the first embodiment, the light beam 36 is set as a diverging light beam. When the light beam 36 propagates in space, the light beam 36 will spread in a conical shape at least at the initial stage. The light beam 36 includes a diffusion section 37, and the size of the diffusion section 37 gradually increases along the extending direction of the light beam 36. The narrow diameter end of the diffusion section 37 comes from the electromagnetic radiation source 31. The beam 36 emitted by the electromagnetic radiation source 31 will produce a larger beam size relative to the beam size at the at the initial stage of the beam 36 exited from the electromagnetic radiation source 31. The larger beam size means that it can cover a larger area on the diaphragm 21, for example, when its aperture 24 is opened to its maximum size due to the sound pressure, the beam 36 can expand to completely cover the area on the aperture 24, so that a wider range of sound signals can be sensed correctly.

Figure 2:
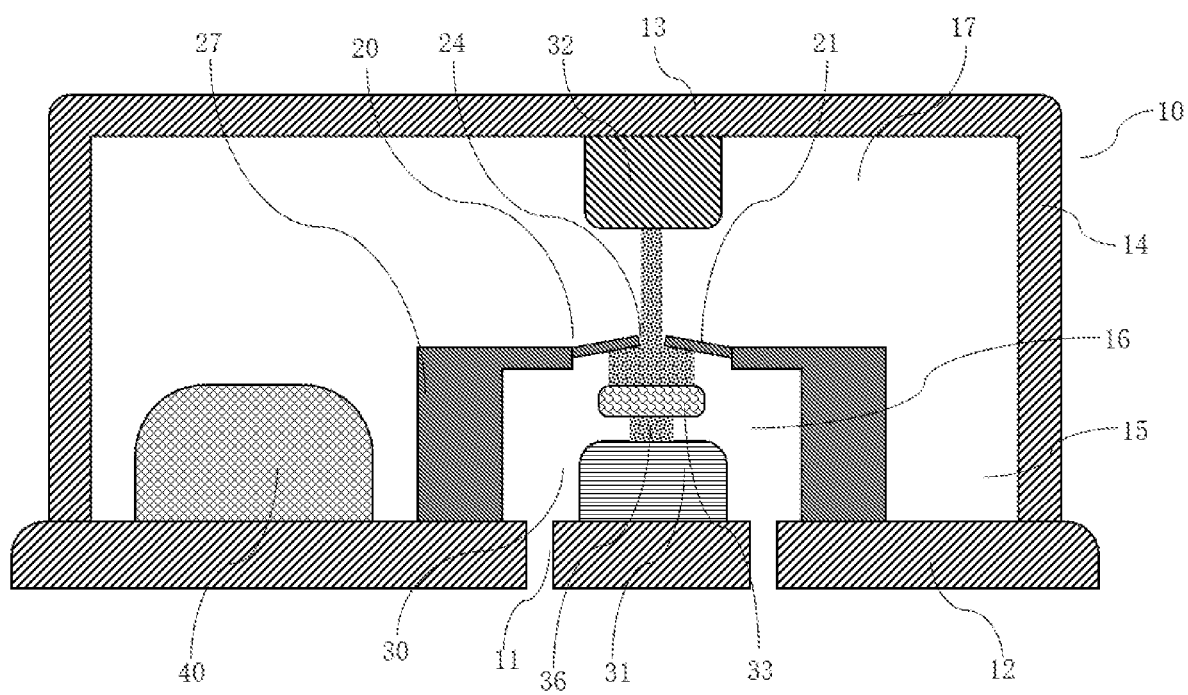
FIG. 2 is a schematic structural diagram of an MEMS optical microphone according to a second embodiment of the present disclosure.

Referring to FIG. 2, FIG. 2 is a schematic structural diagram of an MEMS optical microphone according to a second embodiment of the present disclosure. In the technical solution according to the second embodiment, instead of the diverging beam 36 used in the first embodiment, the electromagnetic radiation source 31 is integrated together with the light diffuser 33. The light diffuser 33 is provided between the electromagnetic radiation source 31 and the diaphragm 21, the light beam 36 penetrates the light diffuser 33 and extends into the aperture 24. The size of the light beam 36 between the electromagnetic radiation source 31 and the light diffuser 33 is smaller than the size of the light beam 36 between the light diffuser 33 and the diaphragm 21. The light diffuser 33 is configured to widen the size of the light beam 36, that is, the smaller size beam 36 can be widened through adjusting parameters of the light diffuser 31 to a size larger than the maximum size of the aperture 24.

Figure 3:
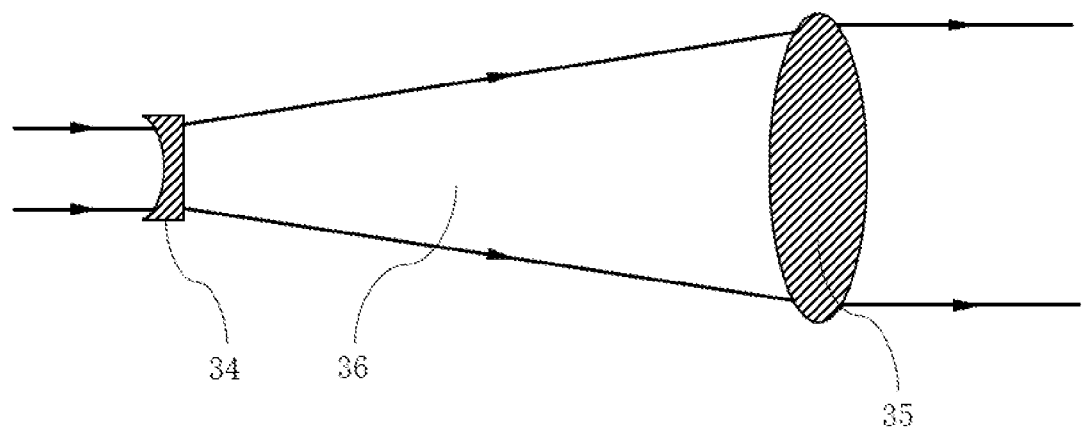
FIG. 3 is a schematic structural diagram of a light diffuser according to the second embodiment of the present disclosure.

Referring to FIG. 3, FIG. 3 is a schematic structural diagram of the light diffuser 33 according to the second embodiment of the present disclosure. The light diffuser 33 is formed by a pair of optical lenses, and the light diffuser 33 includes a plano-concave lens 34 and a biconvex lens 35. The plano-concave lens 34 and the biconvex lens 35 are arranged in sequence along the extending direction of the light beam 36, and the plano-concave lens 34 is closer to the electromagnetic radiation source 31 than the biconvex lens 35. The plano-concave lens 34 and the biconvex lens 35 can be formed on the transparent surface or cover of the electromagnetic radiation source 31, for example, printed microlenses. Alternatively, they can be mounted on a frame or a bracket, and the frame or bracket is inserted between the electromagnetic radiation source 31 and the diaphragm 21.

Figure 4:
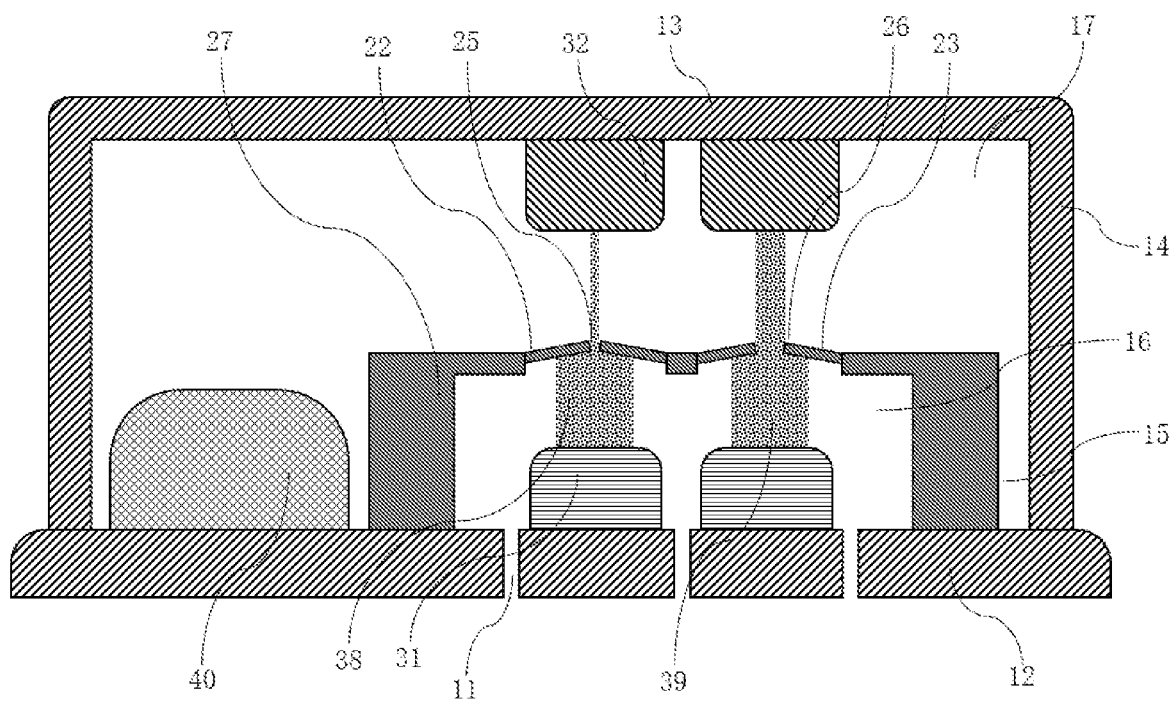
FIG. 4 is a schematic structural diagram of an MEMS optical microphone according to a third embodiment of the present disclosure.
Figure 5:
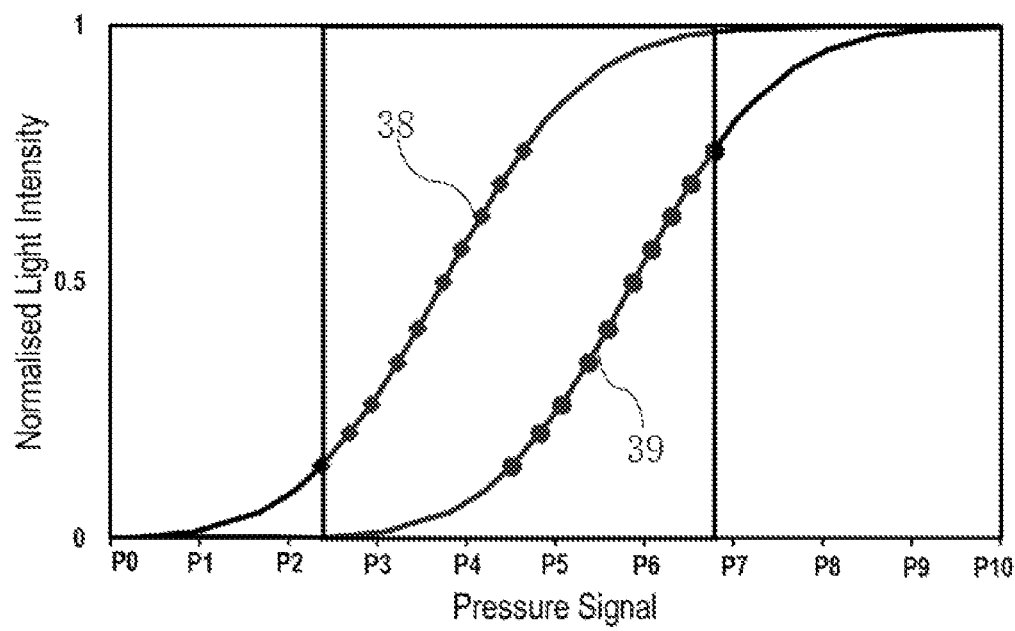
FIG. 5 is a schematic diagram showing relationship between light intensity change and sound pressure change according to the third embodiment of the present disclosure.

Referring to FIG. 4, FIG. 4 is a schematic structural diagram of an MEMS optical microphone according to a third embodiment of the present disclosure. The technical solution in the third embodiment can increase the linear sensing range of the optoelectronic module 30. Referring to FIG. 5, FIG. 5 is a schematic diagram showing relationship between light intensity change and sound pressure change according to the third embodiment of the present disclosure. The measurement curve of light intensity includes a linear region and a nonlinear region on both sides of the linear region, and the sensor 32 has a higher sensitivity in the linear region, so that the applied sound signal can be correctly detected, and the existence of the nonlinear region makes the sensing range of the optoelectronic module 30 smaller than the theoretical minimum and maximum sound wave pressure, so as to increase the sensing range of the optoelectronic module 30. In the third embodiment, the diaphragm 21 is set in the form of multiple membranes. For example, the diaphragm 21 includes a first membrane 22 and a second membrane 23 that are independent of each other, and the light beam 36 includes a first optical path 38 and a second optical path 39 that are independent of each other. The aperture 24 includes a first sub-aperture 25 provided on the first membrane 22 and a second sub-aperture 26 provided on the second membrane 23. The first light path 38 covers the sub-aperture 25, the second light path 39 covers the second sub-aperture 26, and there is a difference between the size of the first sub-aperture 25 and the size of the second sub-aperture 26.

In one embodiment, the first sub-aperture 25 and the second sub-aperture 26 each have a separate electromagnetic radiation source 31 and a corresponding sensor 32. In another embodiment, a single electromagnetic radiation source 31 may be configured to split the two beams 36 by means of a single or multiple optical splitters (not shown) placed above the electromagnetic radiation source 31 and direct them into their respective apertures 24.

In one embodiment, in a balanced state when no pressure or sound signal is applied, the aperture size of the first sub-aperture 25 of the first membrane 22 is the same as the aperture size of the second sub-aperture 26 of the second membrane 23. When sound is applied, the first membrane 22 and the second membrane 23 are actuated together under the action of the sound pressure, and the first sub-aperture 25 is opened, which will allow transmission of a certain amount of light intensity corresponding to the applied sound of a given range, while the second light sub-aperture 26 remains closed. When the applied pressure or sound varies, the light intensity through the first optical path 38 of the first sub-aperture 25 will have a linear or substantial linear change. However, for the same pressure or sound signal range, the light intensity variation will result in a nonlinear variation of the second sub-aperture 26. Similarly, for another sound pressure range, the light intensity varies nonlinearly for the first sub-aperture 25, and for this sound pressure, the light intensity varies linearly or substantially linearly for the second optical sub-aperture 26, thereby increasing the linear sensing range of the optoelectronic module 30.

For the same pressure or sound signal level, diaphragm 21 with varying aperture sizes can be realized by modification of material, for example using a material with different stress for each membrane, resulting in different compliance for each membrane. The membranes are designed such that the pressure ranges of the sub-apertures are continuous. In this way, the combined linear area of each membrane increases, thereby increasing the linear sensing range of the optoelectronic module 30.

In one embodiment, the initial size in the first sub-aperture 25 and the second sub-aperture 26 is set as follows: when the first sub-aperture 25 is opened and allow a certain amount of light to pass therethrough along the first optical path 38, the second optical sub-aperture 26 is in a closed state, and will not allow light to pass therethrough along the second optical path 39. When the first optical sub-aperture 25 reaches the terminal of its linear or substantial-linear region, further increasing the applied pressure signal will cause its light intensity to change non-linearly, while the second optical sub-aperture 26 enters or close to its linear or substantial-linear region. In this way, the pressure or dynamic range of an optoelectronic module can be doubled compared to an optoelectronic module with a single diaphragm 21.

Those skilled in the art can understand that the diaphragm 21 can be divided into two independent first membrane 22 and second membrane 23, and can also be set as including more independent membranes, which is not limited herein.

Referring to FIGS. 1 to 4, the sound inlet 11 is provided on the first shell wall 12, and the MEMS module 20 further includes a support arm 27. The opposite ends of the support arm 27 are respectively connected to the diaphragm 21 and the first shell wall 12, to suspend the diaphragm 21 in the inner cavity 15. The diaphragm 21 separates the inner cavity 15 along the incident direction of the sound wave to form a front cavity 16 and a rear cavity 17. The front cavity 16 covers the sound inlet 11, and the first shell wall 12 includes a PCB substrate, the front cavity 16 refers to the volume between the diaphragm 21 and the sound inlet 11, which means the front cavity 16 is a cavity that does not contain any components to improve performance, and the rear cavity 17 refers to the volume between the diaphragm 21 and the shell 10. The diaphragm 21 of the MEMS 20 is arranged close to the sound inlet 11, so that the volume of the front cavity 16 is small, and the volume of the rear cavity 17 is large, which is beneficial to further improve the performance.

Figure 6:
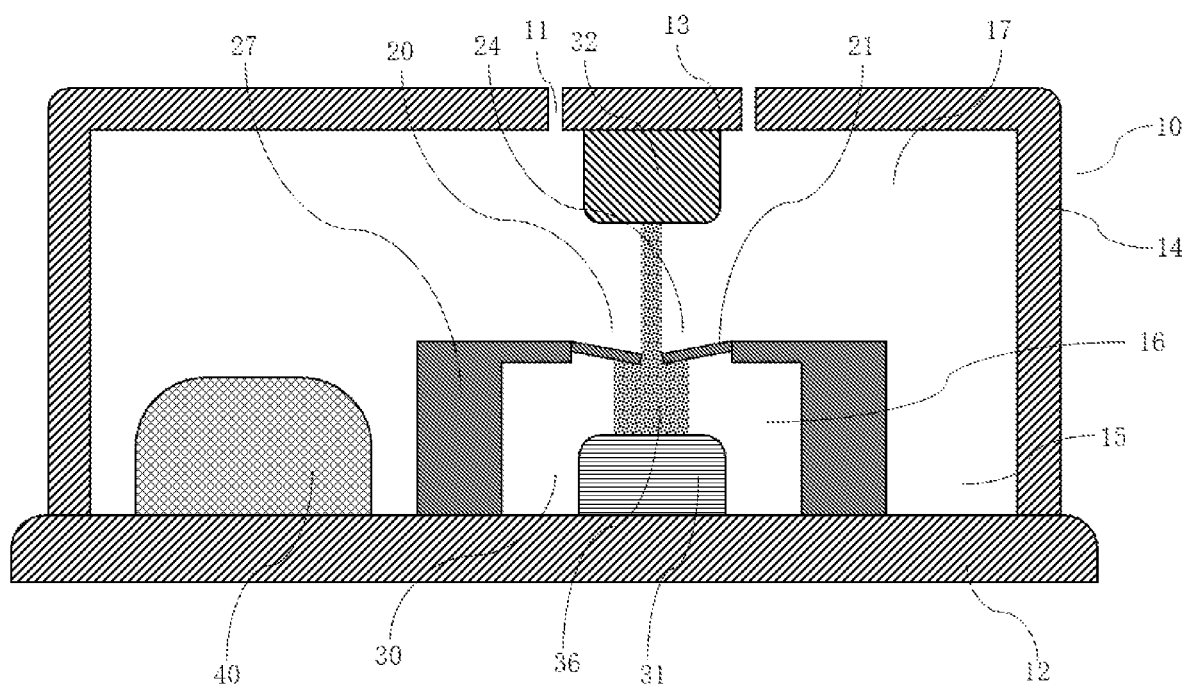
FIG. 6 is a schematic structural diagram of an MEMS optical microphone according to a fourth embodiment of the present disclosure.

Those skilled in the art can understand that the position and number of the sound inlets can be changed. Referring to FIG. 6, FIG. 6 is a schematic structural diagram of an MEMS optical microphone according to a fourth embodiment of the present disclosure. A sound inlet 11 is provided on the second shell wall 13, which allows a pressure or sound signal to reach above the diaphragm 21 and exert pressure on the diaphragm 21.

In one embodiment, a plurality of sound inlets 11 are provided, and the plurality of sound inlets 11 are distributed on the first shell wall 12 or the second shell wall 13 in a circular array. These sound inlets 11 can apply uniform pressure to the diaphragm 21, so as to improve the stability of the diaphragm 21, and increase the linear range of the optoelectronic module 30.

In embodiments according to the present disclosure, the shape of the diaphragm 21 is symmetrical about the center. The shape of the diaphragm 21 is not limited to a circle, but may also be such as a square which is symmetrical about the center. The diaphragm 21 can be made of a single material, and can also be made of multiple materials such as monocrystalline silicon, silicon nitride, silicon oxide, polycrystalline silicon, polyimide, metal, or any combination thereof.

The aperture 24 is located at the geometric center of the diaphragm 21, and the amplitude is the largest at the center of the diaphragm 21. Small vibrations can also cause the size of the aperture 24 to change, thereby affecting the amount of light passing through the beam 33, and thus improving sensing accuracy of the sensor 32.

The structure, features and effects of the present disclosure have been described in detail above according to the embodiments shown in the drawings. The above are only the preferred embodiments of the present disclosure, but the scope of the present disclosure is not limited by the drawings. Changes made to the concept of the present disclosure, or modifications to equivalent embodiments with equivalent changes, shall fall within the protection scope of the present disclosure as long as they do not exceed the spirit covered by the description and drawings.

What is claimed is:

1. A micro-electromechanical system (MEMS) optical microphone, comprising:
   a casing including an inner cavity and a sound inlet that communicates the inner cavity with outside;
   a MEMS module including a diaphragm suspended in the inner cavity, wherein an aperture is provided penetrating through the diaphragm, and a size of the aperture increases or decreases with a magnitude of an acoustic pressure applied to the diaphragm;
   an optoelectronic module including an electromagnetic radiation source and a sensor arranged on opposite sides of the diaphragm, wherein the sensor is configured to receive a light beam emitted by the electromagnetic radiation source, the light beam covers the aperture, and a size of the light beam is larger than a maximum size of the aperture; and
   an integrated circuit module electrically connected with the optoelectronic module;
   a light diffuser arranged between the electromagnetic radiation source and the diaphragm, and the light beam passing through the light diffuser and incident into the aperture, and a size of the light beam between the electromagnetic radiation source and the light diffuser smaller than a size of the light beam between the light diffuser and the diaphragm.

2. The MEMS optical microphone according to claim 1, wherein the light beam includes a diffuser section, a size of the diffuser section gradually increases along an extending direction of the light beam, and a narrow diameter end of the diffuser section comes from the electromagnetic radiation source.

3. The MEMS optical microphone according to claim 1, wherein the light diffuser includes a plano-concave lens and a biconvex lens, and the plano-concave lens and the biconvex lens are arranged in sequence along an extending direction of the light beam, and the plano-concave lens is closer to the electromagnetic radiation source than the biconvex lens.

4. The MEMS optical microphone according to claim 1, wherein the diaphragm includes a first membrane and a second membrane that are independent of each other, and the light beam includes a first optical path and a second optical path that are independent of each other, the apertures include a first sub-aperture on the first membrane and a second sub-aperture on the second membrane; the first light path covers the first sub-aperture, the second optical path covers the second sub-aperture, and there exists a difference between a size of the first sub-aperture and a size of the second sub-aperture.

5. The MEMS optical microphone according to claim 1, wherein the electromagnetic radiation source includes a laser or a light emitting diode, and the sensor includes a photodiode.

6. The MEMS optical microphone according to claim 1, wherein the inner cavity comprises a first shell wall, a second shell wall, and a side shell connecting the first shell wall and the second shell wall, the first shell wall is opposite to the second shell wall; the MEMS module and the integrated circuit module are arranged on the first shell wall, and the sound inlet is provided on the first shell wall or the second shell wall.

7. The MEMS optical microphone according to claim 6, wherein a plurality of sound inlets are provided, and the plurality of sound inlets are distributed on the first shell wall or the second shell wall.

8. The MEMS optical microphone according to claim 6, wherein the sound inlet is provided on the first shell wall, the MEMS module further includes a support arm, and opposite ends of the support arm are connected to the diaphragm and the first shell wall, so as to suspend the diaphragm in the inner cavity; the diaphragm separates the inner cavity along an incident direction of the sound wave to form a front cavity and a rear cavity, and the front cavity covers the sound inlet.

9. The MEMS optical microphone according to claim 1, wherein the diaphragm is formed as a shape symmetrical about a geometric center thereof, and the aperture is provided at the geometric center of the diaphragm.

\* \* \* \* \*